United States Patent
Masuda et al.

(10) Patent No.: US 10,606,658 B2
(45) Date of Patent: Mar. 31, 2020

(54) APPROACH TO RECOMMENDING MASHUPS

(71) Applicant: INTERNATIONAL BUSINESS MACHINES CORPORATION, Armonk, NY (US)

(72) Inventors: Satoshi Masuda, Tokyo (JP); Akiko Suzuki, Tokyo-to (JP); Hiroaki Nakamura, Kanagawa-ken (JP); Toshiro Takase, Chiba-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 519 days.

(21) Appl. No.: 15/077,451

(22) Filed: Mar. 22, 2016

(65) Prior Publication Data

US 2017/0277756 A1 Sep. 28, 2017

(51) Int. Cl.
  *G06F 9/50* (2006.01)
(52) U.S. Cl.
  CPC .................. *G06F 9/5072* (2013.01)
(58) Field of Classification Search
  CPC ......... G06F 17/30525; G06F 17/30598; G06F 17/30554; G06F 9/5072; G06F 9/54
  See application file for complete search history.

(56) References Cited

U.S. PATENT DOCUMENTS

| | | | | |
|---|---|---|---|---|
| 6,487,559 B2 * | 11/2002 | McGrath | ............... | G01C 21/32 707/999.2 |
| 8,533,213 B2 * | 9/2013 | Yassin | ....................... | G06F 8/60 707/759 |

(Continued)

FOREIGN PATENT DOCUMENTS

| | | |
|---|---|---|
| CN | 102750375 | 10/2012 |
| CN | 103473128 | 12/2013 |
| JP | 2010191865 | 9/2010 |

OTHER PUBLICATIONS

Blake, et al., "Mining Social Tags to Predict Mashup Patterns", Proceedings of the 2nd International Workshop on Search and Mining User-generated Contents (SMUC 2010), Oct. 2010, 7 pages.

Han et al., Mining Integration Patterns of Programmable Ecosystem with Social Tags, J. Grid Computing (2014), Jan. 2014, pp. 265-283.

(Continued)

*Primary Examiner* — Miranda Le (74) *Attorney, Agent, or Firm* — Tutunjian & Bitetto, P.C.; Vazken Alexanian (57) ABSTRACT

A method of recommending Mashups, including identifying, using a processor, pre-existing Mashups implementing application program interfaces (APIs), where each implemented API has one or more attached Tag(s) including API characteristics; extracting the characteristics from the Tags attached to the API(s) implemented in the Mashup, form a set including all of the characteristics from the APIs implemented in Mashup; identifying one or more API(s) not implemented in the Mashups; extracting the characteristics from the Tags attached to the API(s) not implemented in the Mashup to form another set; identifying API characteristics that are an element of one set, but not an element of the other set, forming a third set of these characteristics; modeling a relationship between API(s) using the sets; calculating the probability of one or more API(s) not implemented in a Mashup being used for new Mashup; and presenting the API(s) to a user for new Mashups.

12 Claims, 7 Drawing Sheets

(56) References Cited

U.S. PATENT DOCUMENTS

| | | | | |
|---|---|---|---|---|
| 8,549,471 B2* | 10/2013 | Jung | | G06F 9/44 710/1 |
| 8,751,558 B2* | 6/2014 | Bleier | | G06F 9/54 709/201 |
| 8,813,102 B2 | 8/2014 | Kim et al. | | |
| 8,914,368 B2 | 12/2014 | Badenes et al. | | |
| 8,924,955 B2* | 12/2014 | Mehta | | G06F 8/60 717/174 |
| 8,949,214 B1* | 2/2015 | Shah | | G06F 17/30976 707/707 |
| 9,020,907 B2* | 4/2015 | Caire | | G06Q 10/06 707/690 |
| 9,064,224 B2* | 6/2015 | Xiong | | G06Q 10/067 |
| 9,069,873 B2 | 6/2015 | Kim et al. | | |
| 9,329,878 B2* | 5/2016 | Hong | | G06F 3/048 |
| 9,418,168 B2* | 8/2016 | Schmidt | | G06F 17/3089 |
| 2005/0268282 A1* | 12/2005 | Laird | | G06F 8/71 717/121 |
| 2008/0109483 A1* | 5/2008 | Yoo | | G06F 17/3089 |
| 2009/0204594 A1* | 8/2009 | Akkiraju | | G06F 8/34 |
| 2009/0235285 A1* | 9/2009 | Kim | | G06F 17/30961 719/328 |
| 2010/0257242 A1* | 10/2010 | Morris | | G06F 17/3089 709/206 |
| 2011/0047187 A1* | 2/2011 | Sinha | | G06F 9/543 707/802 |
| 2011/0153590 A1* | 6/2011 | Chang | | G06F 17/3089 707/711 |
| 2011/0154373 A1* | 6/2011 | Kim | | G06F 9/5011 719/320 |
| 2012/0209839 A1* | 8/2012 | Andrews | | G06Q 10/10 707/728 |
| 2014/0280147 A1* | 9/2014 | Arabshian | | G06F 17/30734 707/737 |
| 2014/0337372 A1* | 11/2014 | Lee | | G06F 8/30 707/767 |
| 2015/0143435 A1* | 5/2015 | Kim | | H04N 21/25891 725/86 |
| 2015/0378714 A1* | 12/2015 | Katariya | | G06F 8/65 717/170 |
| 2019/0007711 A1* | 1/2019 | Geva | | H04N 21/23424 |

OTHER PUBLICATIONS

ProgrammableWeb—APIs, Mashups and the Web as Platform, http://www.programmableweb.com, Retrieved on Aug. 3, 2015, 4 pages.

Watson-developer-cloud/yourcelebritymatch—GitHub, https://github.com/watson-developer-cloud/yourcelebritymatch, Retrieved on Aug. 3, 2015, 4 pages.

* cited by examiner

APPROACH TO RECOMMENDING MASHUPS

BACKGROUND

Technical Field

The present invention relates to an approach for identifying application program interfaces (APIs) for use in mashups, and more particularly to determining the suitability of particular application program interfaces for use in mashups intended to have particular attributes.

Description of the Related Art

Mashups can typically involve combining existing application program interfaces with data available over a network, like the Internet. ProgrammableWeb® lists open web APIs, which could be used in mashups. Only a portion of available APIs, however, have been used to create existing mashups, so many APIs are stored and available without being used.

SUMMARY

A method of recommending Mashups, including identifying, using a processor, one or more pre-existing Mashups, $m_j$, implementing one or more application program interfaces (APIs), $a_i$, where each implemented API has one or more attached Tag(s), $T_k$, including one or more API characteristics, I; extracting the characteristics, $I_m$, from the Tags, $T_k$, attached to each of the API(s), $a_i$, implemented in the Mashup, $m_j$, to form a set, $S_m$, including all of the extracted characteristics, $I_m$, from all of the APIs, $a_i$, implemented in Mashup, $m_j$; identifying one or more API(s), $a_x$, not implemented in the existing Mashups; extracting the characteristics, $I_x$, from the Tags attached to each of the API(s), $a_x$, not implemented in the Mashup to form a set, $S_x$, including all of the extracted characteristics, $I_x$; identifying one or more API characteristics, $I_q$, that is an element of the set, $S_m$, but not an element of set, $S_x$; forming a set, $S_q$, including the one or more characteristics, $I_q$; modeling, using the processor, a relationship between API(s), $a_x$, having characteristics, $I_x$, and API(s), $a_i$, having characteristics, $I_m$, using the set, $S_m$, and the set, $S_x$; calculating the probability of one or more API(s), $a_x$, not implemented in a Mashup, $m_j$, being used for a new Mashup; and presenting the one or more API(s), $a_x$, to a user for use in the new Mashup.

A mashup recommendation system, including identifying, a processor and memory; a mashup analyzer configured to identify, using a processor, pre-existing Mashups implementing application program interfaces (APIs), where each implemented API has one or more attached Tag(s) including API characteristics; extracting the characteristics from the Tags attached to the API(s) implemented in the Mashup, form a set including all of the characteristics from the APIs implemented in Mashup; identifying one or more API(s) not implemented in the Mashups; extracting the characteristics from the Tags attached to the API(s) not implemented in the Mashup to form another set; identifying API characteristics that are an element of one set, but not an element of the other set, forming a third set of these characteristics; an association rule modeler configured to model a relationship between API(s) using the sets; an API proposer configured to calculate the probability of one or more API(s) not implemented in a Mashup being used for new Mashup; and presenting the API(s) to a user for new Mashups.

A non-transitory computer readable storage medium involving a computer readable program for a method of recommending Mashups, wherein the computer readable program when executed on a computer causes the computer to perform the steps of identifying, using a processor, one or more pre-existing Mashups, $m_j$, implementing one or more application program interfaces (APIs), $a_i$, where each implemented API has one or more attached Tag(s), $T_k$, including one or more API characteristics, I; extracting the characteristics, $I_m$, from the Tags, $T_k$, attached to each of the API(s), $a_i$, implemented in the Mashup, $m_j$, to form a set, $S_m$, including all of the extracted characteristics, from all of the APIs, $a_i$, implemented in Mashup, $m_j$; identifying one or more API(s), $a_x$, not implemented in the existing Mashups; extracting the characteristics, $I_x$, from the Tags attached to each of the API(s), $a_x$, not implemented in the Mashup to form a set, $S_x$, including all of the extracted characteristics, $I_x$; identifying one or more API characteristics, $I_q$, that is an element of the set, $S_m$, but not an element of set, $S_x$; forming a set, $S_q$, including the one or more characteristics, $I_q$; modeling, using the processor, a relationship between API(s), $a_x$, having characteristics, $I_x$, and API(s), $a_i$, having characteristics, $I_m$, using the set, $S_m$, and the set, $S_x$; calculating the probability of one or more API(s), $a_x$, not implemented in a Mashup, $m_j$, being used for a new Mashup; and presenting the one or more API(s), $a_x$, to a user for use in the new Mashup.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Principles and embodiments of the present disclosure relate generally to identifying application program interfaces (APIs) for use in Mashups using association rules based on API tags associated with the application program interfaces. The APIs may be located on remote computer systems connected through a network and/or forming network resources, which may be in the cloud. An API may provide programming access to an otherwise proprietary application program.

Much time, money, and effort may be wasted in attempting to identify suitable APIs for use in creating a Mashup, and the most suitable APIs may even be overlooked because they may not be known to exist or their suitability may not be readily recognized by ordinary review. The efficiency and/or selectivity of constructing Mashups can, therefore, be improved by searching for available APIs, preemptively identifying APIs more suitable for a Mashup through analysis of the metadata stored in Tags attached to the APIs, and reducing the number of APIs to be considered for implementation in a Mashup. In various embodiments, selectivity of APIs may be improved 2.3 times compared to other approaches that do not involve use of API tags.

A large number of APIs may be reduced by determining a score for each API based on the metadata associated with the API and metadata associated with APIs utilized for a creating a Mashup with desired attributes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In various embodiments, a method of identifying and recommending APIs may start by checking to see if a web site has an official API, for example, an API for Google Maps™, Twitter, Facebook, etc. Open API repositories like ProgrammableWeb® may have lists and hyperlinks of open APIs, where a search may begin with a list of available open APIs and continue with an analysis of tags attached to each API.

Tags can include metadata describing the contents and context of an API. The metadata may capture knowledge in the form of descriptions, categorizations, classifications, semantics, comments, notes, annotations, hyperdata, hyperlinks, or references that are collected in tag profiles. Tags may also include keywords that may identify themes and concepts of the API subject matter, and describes or defines some technical aspect of an information resource (e.g., data input) utilized by the API. The Tag metadata may be mined for resource discovery, and may be used to organize electronic resources, and/or provide digital identification. APIs may be stored on servers using the attached metadata to classify and organize the APIs.

Mashups may be analyzed to find inter-relationships between Tag items stored in a database. Models correlating Tag items with applicability to creation of a specific Mashup may be generated based on the inter-relationships.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In one or more embodiments, a plurality of application program interfaces (APIs) may be located on one or more remote computer systems, where one or more tags may be associated with each API. Each API may have specific components and interface features including, for example, input formats, output formats, and function requirements specified for remote calls that differentiate an API from other APIs. The API may assist with integration of resources and functionalities from an application. API tags may be associated with an API, where the tag may identify and/or describe the API. A tag may be chosen informally by its creator to label an API in a manner that may provide classification and subsequent identification of the particular API. Tags may include text, for example keywords, as part of the classification and identification.

The APIs may be located over multiple administrative domains on multiple local networks on a computer system. In one or more embodiments, a computer system may be a laptop computer, a desktop computer, or a server, where a server may include web servers and applications servers. Each computer system may be local or remote from other computer system(s), where a remote computer system may be geographically separated from other computer systems, and/or where a remote system may have to communicate with other computer systems over network (e.g., wireless, broadband, Internet, PSTN), and/or may have a separately identifiable network address from other computer systems. A local computer system may be directly coupled to another computer system. The remote computers may be servers and/or client computers.

A plurality of business entities may operate one or more computer systems configured to communicate with other remote systems, where the computer systems store and maintain open APIs for use by outside entities. The open APIs may be used in Mashups by integrating one or more APIs with one or more data sources, where the Mashup may be a client-side Mashup or a server-side Mashup.

In one or more embodiments, identification of one or more API(s) for use in a Mashup may be based on information stored as metadata in Tag(s) that are attached to an API. In various embodiments, a plurality of Tags containing metadata information may be analyzed to identify APIs indicated as having characteristics suitable for use in a particular Mashup. A Mashup may have attached tags providing information as metadata about the Mashup attributes that may be used to establish associations between previously created Mashups and the APIs.

Formation of a Mashup may involve identification of one or more APIs located on remote computer systems through recognition of Tag metadata indicating the API has predetermined characteristics. Information conveyed by Tag metadata may include characteristics of the API, including: author, language(s) (e.g., German, Indian, Scottish, etc.), forms, mapping, voting, drawing, solar, boating, beer, babies, sentiments, concepts, engagements, tools, messaging, webhooks, data-mining, and taxonomy classifications, which may be conveyed as keywords. For example, the Google Maps™ API has Tags attached with "mapping" and "viewer" characteristics, and the Twitter API has Tags attached with "social" and "blogging" characteristics.

Difficulties arise in identifying suitable APIs for use in a new mashup from those available. Typically, a limited number of popular APIs are repeatedly used to create mashups; however, most of the existing APIs have not been utilized for mashups. As a result, developers can find it difficult to understand how to leverage the capabilities of these unused APIs, since there are no actual usage examples in mashups that may be leveraged to gain such understanding. The one or more embodiments of the disclosure can assist in overcoming these difficulties by identifying previously unused APIs for use in creating new mashups.

In one or more embodiments, association rules may be applied to determine relationships between API characteristic(s) and applicability for use in a particular type of Mashup. The type of API characteristic(s) (e.g., social, marketing, communication, messaging, etc.) utilized for a Mashup, and/or one or more attributes (e.g., language, data type (e.g., text, image, RSS), formatting, etc.) for the Mashup may be modeled to determine a probability that a previously unused API should be recommended for a Mashup. Modeling a relationship between API(s), $a_x$, having characteristics, $I_x$, and API(s), having characteristics, $I_m$, using the set, $S_m$, and the set, $S_x$; may be done using a processor. One or more APIs may be recommended to a user based on the specified type of Mashup being created, one or more predetermined attributes for the Mashup, and recognized characteristic(s) of the API. The API characteristic(s) and/or Mashup attribute(s) may be selected by a user looking to create a new Mashup.

In one or more embodiments, a recommended API may be integrated with a data source to create a Mashup. Creation of a Mashup may be an application including computer code configured to combine the functionality of the recognized API and the intended data to form a dynamic webpage for display to one or more users, where the combination of API functionality and data may provide previously unavailable synergistic benefits. One or more APIs may be integrated into a Mashup, where each of the APIs may be recommended based on separate type and/or attribute specifications. A new Mashup may be created from the one or more API(s) by preparing computer code, using a processor, that integrates functions and formats of one or more API(s).

In one or more embodiments, suitable APIs may be identified based on association rules applied to sets, where all possible association rule are traversed without narrowing the search range based on threshold values. In various embodiments, determining the association rule does not require a lower limit of confidence value.

One or more APIs, $a_i$, may form a set A, where A={$a_i$}. All known APIs may be included in set A.

One or more Mashups, $m_j$, may form a set M, where M={$m_j$}. All known Mashups may be included in set M.

On or more Tags, $t_k$, may form a set T, where T={$t_k$}. All known Tags may be included in set T.

One or more APIs, $a_i$, may be used to create Mashups, where the one or more APIs used to create a Mashup, $m_j$, may form a subset A($m_j$), where A($m_j$)={$a_i$|for every $a_i$ associated with an $m_j$, $a_i \in A$, $m_j \in M$}, A($m_j$)⊆A. A list of known Mashups may be analyzed to determine which APIs, $a_i$, have been implemented to create each of the Mashups, $m_j$. A list of known open APIs forming A may be searched to determine if an API has been utilized in a Mashup, where A may be compiled from remote computer systems. A subset A($m_j$) may be formed of all APIs, {$a_i$}, identified as being implemented in each Mashup, $m_j$. Not all $a_i$ may be used for a set of Mashups, {$m_j$}, so subset A($m_j$) may include fewer set elements than A, A($m_j$)⊂A.

One or more APIs, $a_i$, may not be used to create a Mashup, which may form a subset A(x), where A(x)={$a_i$| for every $a_i$ not associated with an $m_j$, $a_i \in A$, $m_j \in M$}, A(x)⊆A. A(x) and A($m_j$) are mutually exclusive, A(x)∩A($m_j$)=∅.

One or more APIs, $a_i$, may be used to create a single Mashup, where the one or more APIs, $a_i$, used to create a single specific Mashup, $m_1$, may form a subset A($m_1$), where A($m_1$)={$a_i$| for every $a_i$ associated with specific Mashup, $m_1$, $a_i \in A$, $m_1 \in M$}, A($m_1$)⊆A(m). An API may be used to create more than one Mashup.

One or more Tags may be attached to an API, $a_i$, where the one or more Tags, $t_k$, attached to an API, $a_i$, for all known APIs, may form a subset T(a), where T(a)={$t_k$| for every $t_k$ associated with an $a_i$, $a_i \in A$, $t_k \in T$}, T(a)⊆T. The Tags may contain metadata regarding a characteristic associated with the API to which it is attached.

One or more Tags may be attached to an API, $a_i$, where the one or more Tags, $t_k$, attached to an API, $a_i$, for a subset of APIs, may form a subset T($a_i$), where T($a_i$)={$t_k$| for every $t_k$ associated with an $a_i$, $a_i \in A$, $t_k \in T$}, T($a_i$)⊆T. The Tags may contain metadata regarding a characteristic associated with the API to which it is attached.

One or more Tags may be attached to a single API, where the one or more Tags, $t_k$, attached to a single specific API, $a_1$, may form a subset T($a_1$), where T($a_1$)={$t_k$| for every $t_k$ associated with specific API $a_1$, $a_1 \in A$, $t_k \in T$}, T($a_1$)⊆T.

A subset of Tags, $t_k$, attached to an API, $a_i$, where the API, $a_i$, is used by a Mashup, $m_j$, may form a subset TS($m_j$), where TS($m_j$)={$t_k$| for every $t_k$ associated with API $a_i \wedge$ every $a_i$ associated with $m_j$, $a_i \in A$, $m_j \in M$}, TS($m_j$)⊆T(a). TS($m_j$)=T($a_1$)∪T($a_2$)∪ . . . T($a_n$), where A($m_j$)={$a_1$, $a_2$, . . . , $a_n$}. For example, TS($m_j$)=TS($a_1$)∪TS($a_2$). T($a_1$)={$t_{1(a1,\ m1)}$, $t_{2(a1,\ m1)}$, $t_{3(a1,\ m1)}$}; T($a_2$)={$t_{1(a2,\ m1)}$, $t_{2(a2,\ m1)}$, $t_{3(a2,\ m1)}$}; TS($m_1$)={$t_{1(a1,\ m1)}$, $t_{2(a1,\ m1)}$, $t_{3(a1,\ m1)}$, $t_{1(a2,\ m1)}$, $t_{2(a2,\ m1)}$, $t_{3(a2,\ m1)}$}.

Each Tag, $t_k$, may be an API characteristic, I, where I can be any characteristic that may be associated with an API. One or more API characteristic(s), I, may form a set S, where S={I}.

One or more API characteristics, $I_m$, may form a subset $S_m$, where $S_m$={$I_m$}, {$I_m$}⊆{I}.

One or more API characteristics, $I_q$, may form a subset $S_q$, where $S_q$={$I_q$}, {$I_q$}∈{I}. In various embodiments, {$I_q$}∉{$I_m$}.

One or more Mashup attributes, $b_p$, may form a set $B_m$, where $B_m$={$b_p$}.

One or more Association Rules, $r_n$, may form a set R, where R={$r_n$}.

Association Rules, $r_n$, may be identified in database(s) storing information about APIs, $a_i$, with attached Tags, $t_k$, used to create existing Mashups, $m_j$, with known attributes, $b_p$.

A rule, "{,}⇒{ }", may be understood to be a recognized relationship between Tags, $t_k$, attached to APIs, $a_i$, used to create existing Mashup, $m_j$, (i.e., TS($m_j$)), Tags, $t_x$, attached to APIs, $a_x$, not used to create existing Mashup, $m_j$, and Tags, $t_k$, attached to APIs used to create existing Mashup, $m_j$, but not Tags, $t_x$. T(x)⊆{∀$t_k$∈T(a)|∀a∈A(m). T(a)∩TS($m_j$)=∅}. In various embodiments, only the APIs, for which none of whose API characteristics are included in $I_m$, may be selected. Such selection segregates API characteristics known to be associated with a Mashup from API characteristics not previously associated with a Mashup.

Tags, $t_k$, may include API characteristics $I_m$, forming set $S_m$, Tags, $t_x$, may include API characteristics $I_x$, forming set $S_x$, and Tags, $t_k$, may include API characteristics $I_q$, forming set $S_q$, where $S_x$, $S_m$, $S_q$⊆{I}, $S_x$⊆$S_m$, $S_q$⊆$S_m$, and $S_x \cap S_q$=∅. $S_x \cup S_q$=$S_m$. One or more API characteristics, $I_q$, that is an element of the set, $S_m$, but not an element of set, $S_x$; may be identified.

The relationship(s) may be used to model API utilization for the creation of Mashups. The relationship may indicate a probability of APIs, $a_x$, not used to create existing Mashup, $m_j$, being suitable for creation of a new Mashup similar to existing Mashup, $m_j$, using APIs, $a_i$.

In one or more embodiments, let $S_x$ and $S_q$ be unknown subsets of S. Then by regarding $S_m$ as a set of API characteristic(s), $\{I\}$, and $S_R = \{TS(m_j) | \forall\ m_j \in M\}$ as a set of Association Rules for $\{I_m, I_x\} \Rightarrow I_q$, where $S_x$ and $S_q$ are subsets of S, that can be determined. Let P be a set of mashup-tag pairs $\{<m_j, t_k>\}$, where $m_j \in M$, and $t_k \in T$. P is an intermediate data structure for computing a confidence. In various embodiments, a Mashup-Tag pair may be formed to calculate the maximum value of the confidence for a specific pair of a Mashup and API.

For an Association Rule, $r_n$, if $\{I_m, I_x\} \Rightarrow I_q$, is a probability of $a_i$, having API characteristics, $I_x$, being suitable for creation of a new Mashups similar to existing Mashup, $m_j$, using APIs, $A(m)$. A relationship may be determined between Mashup(s) having attributes, $b_p$, and API(s) having characteristic items, $I_x$, such that analysis of Tags, $T(a)$, attached to APIs can be utilized to identify likely candidates for a new Mashup intended to have particular attributes, $b_p$. An association rule may be determined from the set, $S_m$, and the set, $S_x$, that connect API(s), $a_x$, with Mashups, $m_j$.

In various embodiments, when all of the following conditions are satisfied, it can be said that when $\{I_m, I_q\} \Rightarrow I_q$, then $a_i$ connects with $m_j$:

1) $S_m \subseteq T(a)$;
2) $S_m \subseteq TS(m_j)$;
3) $S_q \subseteq \{\forall I \in S | \forall a_i \in A(m). T(a_i) \cap S_m = \emptyset\}$. ($S_q$ is the set of characteristics, $I_q$, for all API characteristics, I, that are elements of S, such that for each API, $a_i$, that is implemented in a Mashup, $m_j$, and thereby an element of $A(m)$, where $I_q$, are not in the set, $S_x$.

In one or more embodiments, the confidence value of an Association Rule, $\{I_m, I_q\} \Rightarrow I_q$, is the proportion of the occurrences, $\{O_n\}$, that contains API characteristic, $I_m$, which also connects with API characteristic, $I_q$. $C_i(a) = \text{conf}(S_m \Rightarrow S_q) = \text{supp}(S_m \cup S_q)/\text{supp}(S_m)$. Confidence can be equated to the conditional probability of P $(S_q | S_m)$.

In various embodiments, if $T_1 \subset T_2$, then the confidence of $T_1 \Rightarrow T_1 \geq$ confidence of $T_1 \Rightarrow T_2$, a maximum value for the confidence of the association rules may be computed, where the right side may be a set with a single element, which may prevent a computational explosion of combinations. $T_1$ and $T_2$ are variables having a value of $t_k$.

In one or more embodiments, a maximum confidence score, $C_a$, may be associated with an API, where the maximum confidence score, $C_a$, may be calculated from all individual confidence scores, $C_i(a)$. $C_a = \max C_i(a)$ for all i's. A maximum confidence score, $C_a$, may be calculated for each identified API in the set, $A(m_j)$. The maximum confidence score, $C_a$, for an API may be compared and/or hierarchically ranked against the $C_a$ of all other identified APIs to determine an API with the maximum $C_a$.

In one or more embodiments, an association rule may be established when two or more API characteristics included in API tags, $t_k$, for APIs integrated to create a Mashup coincides with API characteristics included in API tags, $t_x$, not used to create the Mashup. For example, if {language, sentiment} $\Rightarrow$ {messaging}, where {language, sentiment} occur in both API tags, $t_k$, for APIs integrated to create a Mashup and in API tags, $t_x$, for an API not used to create the Mashup, an association rule having an individual confidence scores, $C_i(a)$, can be determined for the likelihood that the API not used to create the Mashup may be used to create an Mashup with an API tag, $t_k$={messaging}.

In a non-limiting example of an embodiment, the ratio of Mashups that use a specific API in comparison to a plurality of other APIs in a plurality of Mashups may be calculated, where the plurality of Mashups may be a predetermined number of Mashups having a predetermined characteristic. Confidence=$|\{\forall m_j \in M | \forall <m_j, t_k> \in P\}|/|\{\forall m_j \in M | t_k \in TS(m_j)|$, where P is a pair set $\{<m_j, t_k>\}$, where $m_j \in M$, and $t_k \in T$.

In one or more embodiments, APIs having comparatively high Confidence scores may be recommended to a user and implemented in creating a new Mashup. For example, the APIs having the top 5 Confidence scores, or the top 10 Confidence scores, or the top 1% Confidence scores, or the top 5% Confidence scores or the top 10% Confidence scores may be recommended depending on the number of APIs evaluated and/or a predetermined threshold Confidence score.

$P = P \cup \{<m_j, t_k>\}$ if all of the elements in $T_1$ are included in the set of tags attached to APIs used by $m_j$, and there exists an API used by $m_j$ such that 1) none of the tags attached to the API are included in T, and 2) $t_k$ is included in the tags of the API, where $T_1$ is any subset of $T(a)$.

Figure 1:
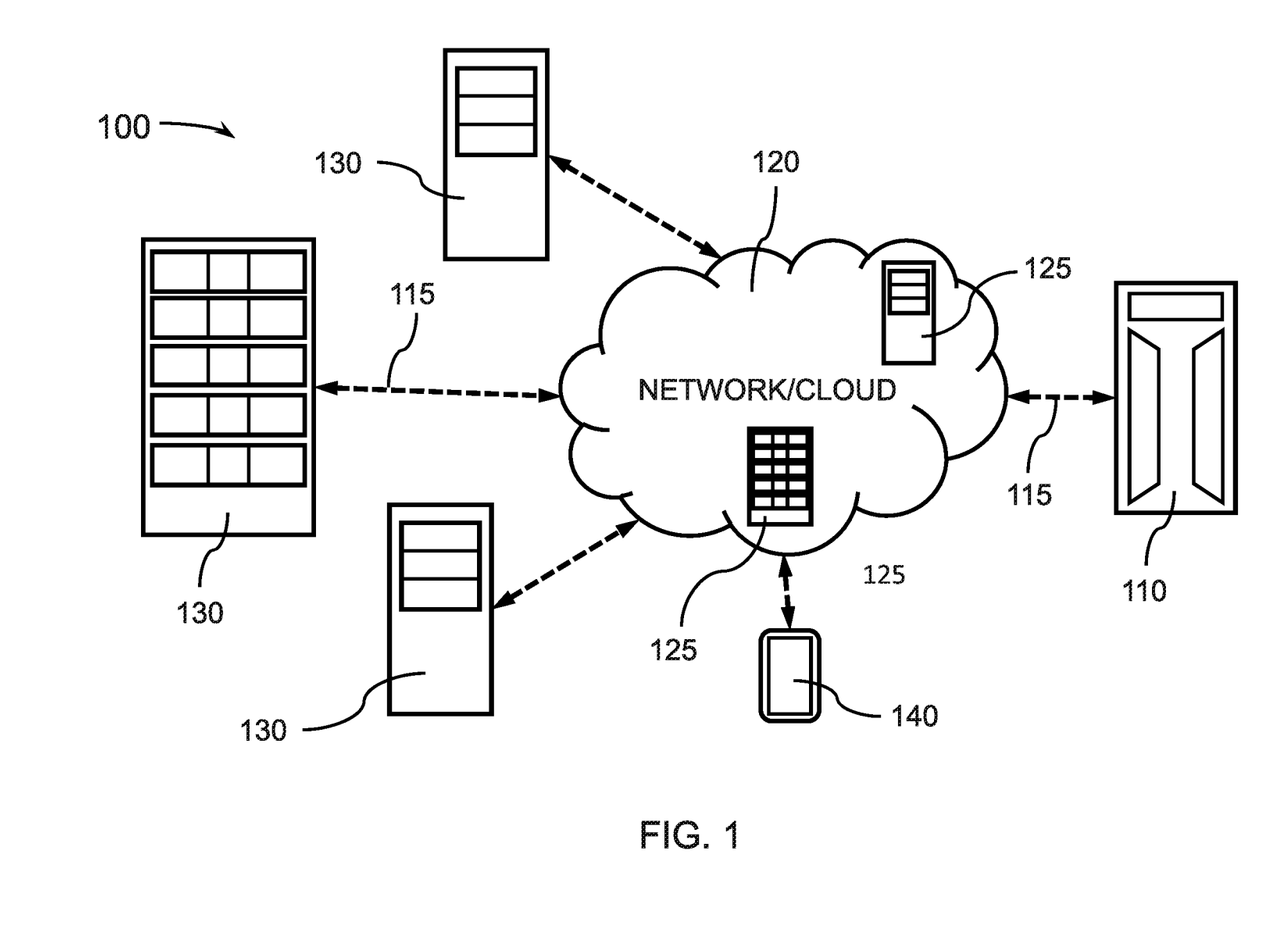
FIG. 1 is a diagram of a system for identifying APIs in accordance to an exemplary embodiment.

Referring now to the drawings in which like numerals represent the same or similar elements and initially to FIG. 1, which is a diagram of a system for identifying APIs in accordance to an exemplary embodiment.

A system 100 for locating and analyzing APIs for use in a Mashup may include a mashup recommendation system 110 connected to one or more computer systems, where the computer systems may be remote computer systems, and where the remote computer systems may be network resources 125 or entity resources 130. Network resources may make up portions of a public network (e.g., Internet, World Wide Web, etc.) or be part of a cloud 120. Entity resources 130 may be computer systems provided and/or maintained by a business entity (e.g., Google®, Twitter®, Facebook®, eBay®, PayPal®, etc.) that may be connected to one or more private networks (e.g., LAN, WAN), but not forming the public network or cloud resource.

In one or more embodiments, mashup recommendation system 110 may be in electronic communication with network resources 125 and/or entity resources 130 over communication path(s) 115, which may be wired (e.g., coaxial cable, fiber optic, twisted pair), wireless (e.g., cellular, satellite, WiFi), or a combination thereof. Client devices 140 may be remotely connected to a network 120 and/or a mashup recommendation system 110 and/or network resources 125 or entity resources 130 over a communication path 115. Network resources 125 or entity resources 130 may be servers configured to provide access to web pages, application programs, data, and/or program components (e.g., APIs, Mashups, Tags).

In various embodiments, a client device 140 may have access to Mashups and APIs for interacting with entity resources 130 and network resources 125, where a client device 140 may use a Mashup that accesses data and applications over the network 120 and/or in the cloud. The Mashup may be a Mashup generated by the mashup recommendation system 110.

In various embodiments, mashup recommendation system 110 may have access to one or more program components for identification of APIs, Tags, and Mashups, and analysis of API characteristics stored in Tags as metadata attached to APIs, Mashup attributes stored in Tags as metadata attached to Mashups, and transactions associating APIs with Mashups. The mashup recommendation system 110 may identify, using a processor, one or more pre-existing Mashups implementing one or more application program interfaces (APIs).

Figure 2:
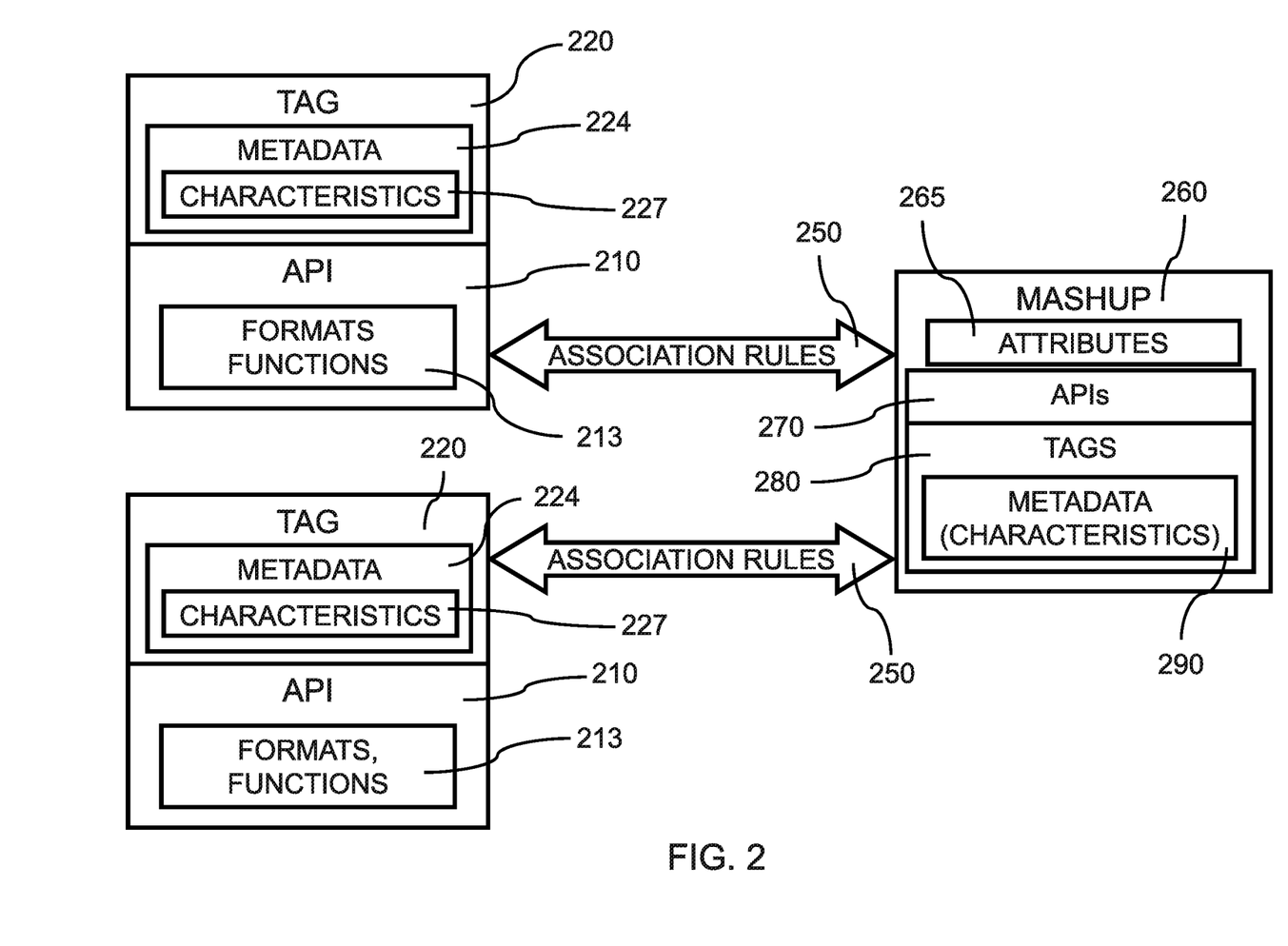
FIG. 2 is a block diagram illustrating associations between a Mashup and API Tags according to an exemplary embodiment.

FIG. 2 is a block diagram illustrating associations between a Mashup and API Tags according to an exemplary embodiment.

A Mashup 260 stored in memory on network resources 125, entity resources 130, or client devices 140 may have attributes 265, including types and condition(s) that describe features and functionality of the Mashup 260, where the attributes 265 may distinguish the particular Mashup 260 from other Mashups. In various embodiments, one or more pre-existing Mashups, $m_j$, may be stored in the one or more servers. A Mashup 260 may be constructed from one or more APIs 270, where each API may have a Tag 280 attached by the creator of the API that describes characteristics 290 of the API 270.

A plurality of APIs may be located on network resources 125 or entity resources 130, where the APIs may or may not have been utilized to create a Mashup 260.

A Tag 220 may be attached to a an API 210, where the Tag 220 contains metadata that includes characteristics 227 of the API 210. The API may include particular formats and functions 213 that determine interactions with application programs, data, and other APIs, as well as output generated by the API (e.g., Hypertext Markup Language, (HTML), JavaScript Object Notation (JSON), Extensible Markup Language (XML), etc.).

An API 210 not yet utilized to create a Mashup 260 may be analyzed to determine its suitability to form Mashups through association rules 250. An association rule 250 may compare Tags 280 attached to APIs 270 used to create a Mashup 260 with Tags 220 attached to APIs 210 not yet utilized to create a Mashup. The probability of an API 210 being used to create a new Mashup having similar attributes and APIs as the existing Mashup 260 may be modeled using a plurality of association rules 250. One or more API(s), $a_x$, to be presented to a user may be selected based on a maximum value of confidence, C.

In various embodiments, a list of likely APIs 210 not yet utilized to create a Mashup may be presented to a user based on the results of the model. A new Mashup may be created from one or more APIs 210 not yet utilized to create a Mashup based on the generated model. A new Mashup may be generated with hypertext markup language (HTML) to access materials stored on servers. In various embodiments, code may be generated to create a Mashup linking API(s) identified by a mashup recommendation system 110 and data resources on a network, where a client 140 may then have access to the newly created Mashup.

In one or more embodiments, a plurality of association rules 250 may be formed based on inter-relationships between Tags 220, 280 based on a probability that an API not used to create existing Mashups is suitable for creation of a new Mashup similar to existing Mashup 260.

Figure 3:
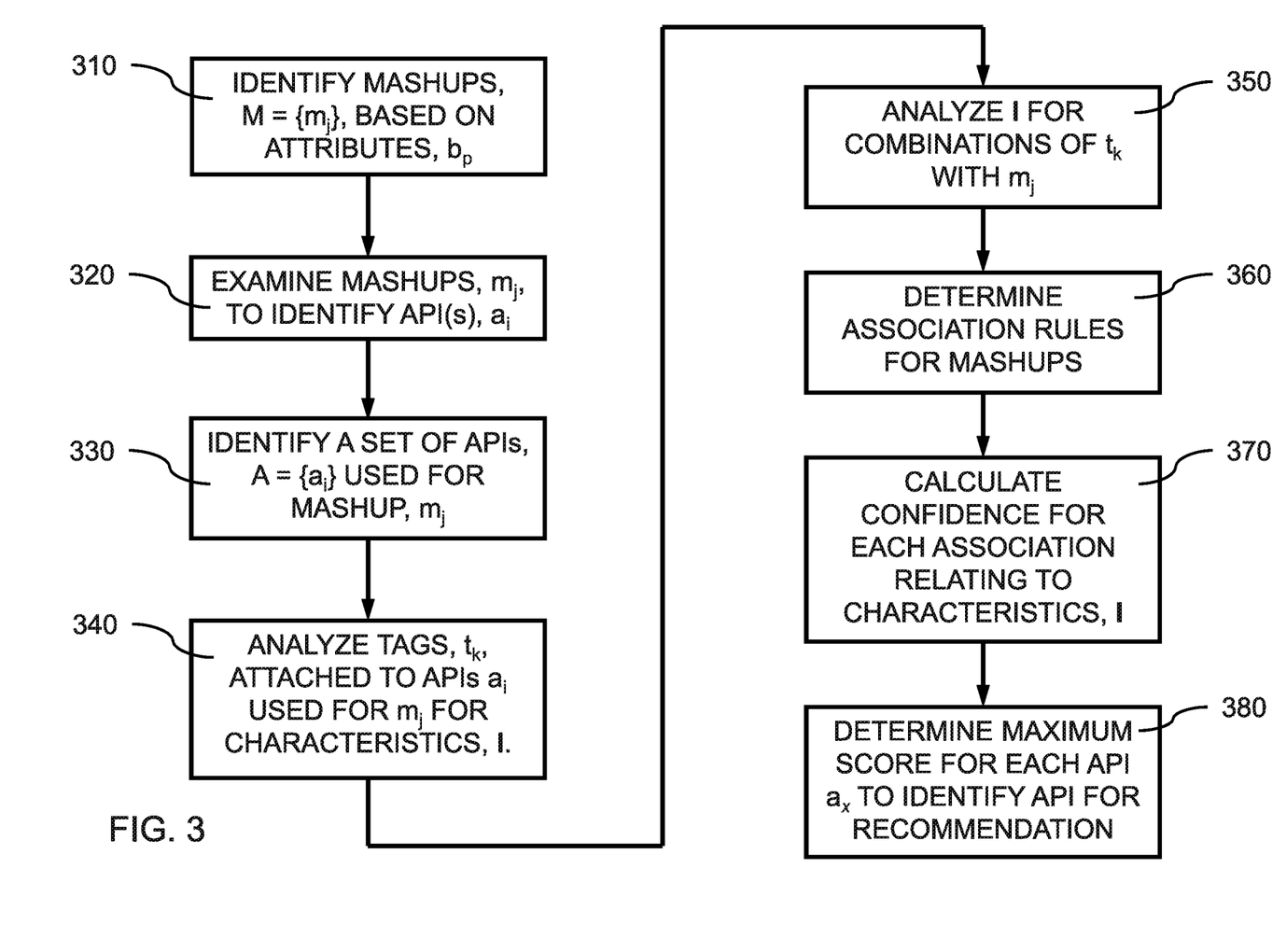
FIG. 3 is a block/flow diagram illustrating an association process between a Mashup and API Tags according to an exemplary embodiment.

FIG. 3 is a block/flow diagram illustrating an association process between a Mashup and API Tags according to an exemplary embodiment.

In one or more embodiments, an existing Mashup, $m_j$, and one or more APIs, forming that Mashup may be identified. The Mashup, $m_j$, may be identified based on one or more attributes, $b_p$, where the one or more attributes, $b_p$, may be selected by a mashup recommendation system 110 identifying API(s) used to create similar Mashups, or a user intending to create a similar Mashup using an API, $a_x$, not previously used to create a Mashup.

In block 310, one or more existing Mashup(s), $m_j$, may be identified, and a set M formed with the identified Mashups M={$m_j$}. Each of the Mashup(s) in M may have at least one attribute, $b_p$, in common, where the attribute may have been determined by a mashup recommendation system 110 or selected by a user. The Mashups may be identified by their common attribute(s), where a particular type of Mashup may have specific attributes in common. The Mashups may be stored on remote systems 120, 130.

In block 320, each identified, existing Mashup, $m_j$, is examined to determine the one or more API(s), $a_i$, used to form the Mashup. A Mashup may be created using one or more API(s) that provide a specific functionality to the Mashup. The API(s), $a_i$, used by one Mashup, $m_1$, may form a set, $A(m_1)=\{a_i\}$.

In block 330, a set, $A(m)=\{a_i\}$ is created from all the APIs forming Mashup(s), $m_j$. Set A(m) may be used to identify APIs not used to form a Mashup by eliminating APIs in A(m) from a set of all known APIs, A. Several APIs, $\{a_1, a_2, \ldots a_n\}$, may be combined in forming a Mashup to provide a variety of functionality and/or combine a variety of data, which may then be displayed in a new manner.

In block 340, the Tags, $t_k$, attached to each API, in set $A(m)=\{a_i\}$ are analyzed to determine which characteristics have been assigned to each API, where the characteristic may convey a particular contextual meaning about the API. For example, API(s) constructed for providing mapping functions for social gatherings may be identified by 'mapping' and 'social' Tags. An API constructed for providing mapping functions for social gatherings to German tourists may further include a 'German' Tag.

In block 350, the characteristics, I, identified in the Tags, $t_k$, attached to APIs, may be analyzed to determine what combination of characteristics have been associated with the Mashup, $m_1$, to determine Association Rules.

Figure 4:
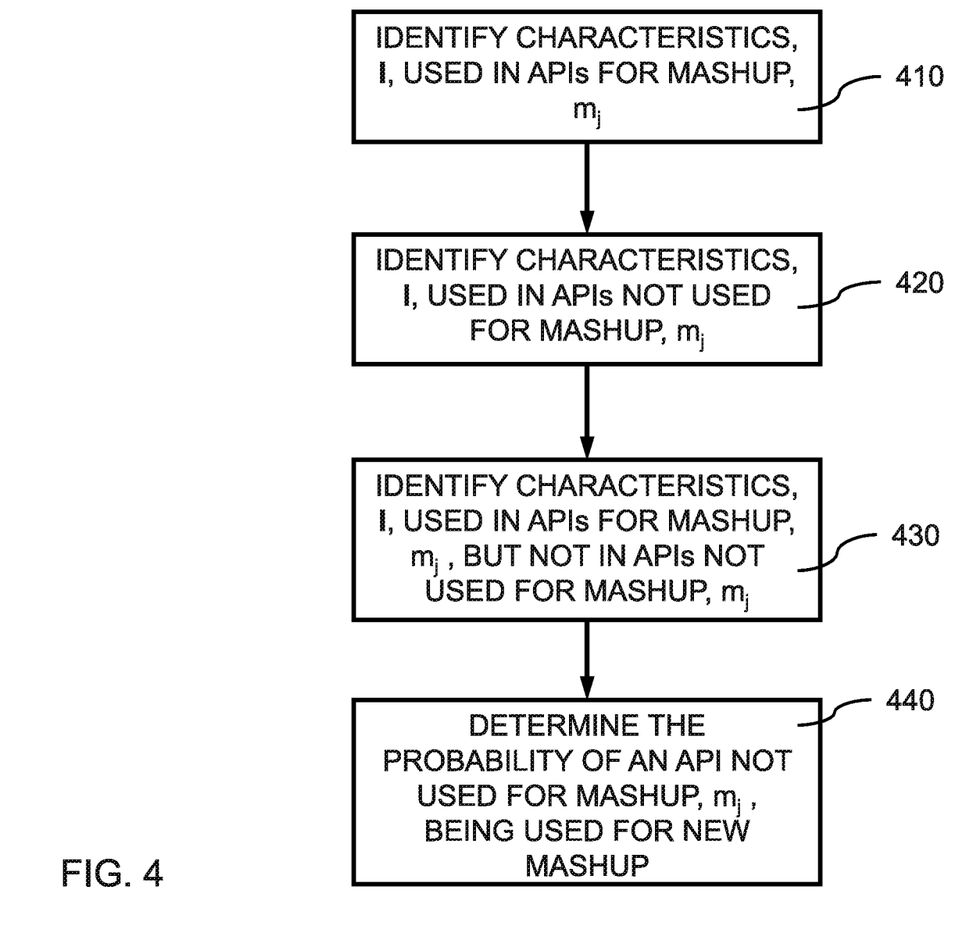
FIG. 4 is a block/flow diagram illustrating a determination process of an Association Rule according to an exemplary embodiment.

In block 360, Association Rules, $r_n$, are determined for the APIs of one or more Mashup(s), $m_j$, where the Mashups may be identified Mashups. The Association Rules, $r_n$, may form a set R, where R={$r_n$}. In various embodiments, the characteristics, I, of each Tag, $t_k$, attached to each API utilized for a specific Mashup, $m_1$, may be compared to the characteristics, $I_x$, of an API, $a_x$, not previously used to create a Mashup to determine which characteristics are the same for both APIs in set A(m) and API, $a_x$, as shown in FIG. 4. An Association Rule may be determined for each relationship between characteristics that are the same for both APIs in set A(m) and API, $a_x$, with characteristics that are only associated with APIs in set A(m) and do not appear in API, $a_x$. Such relationship can be described by a mashup-tag pair, $<m_j, t_k>$.

In block 370, a confidence is calculated for the association rule, $r_n$, that the set of characteristics included in both $I_m$ and $I_x$ for APIs $a_x$ and $A(m_1)$ will also include an API with characteristic in $I_q$, where the confidence is the proportion of the occurrences, $\{O_n\}$, where $\{I_m, I_q\} \Rightarrow I_q$. $C_i(a)=\text{conf}(S_m \Rightarrow S_q)$.

In block 380, the maximum confidence is determined for each combination of APIs and Mashups to identify the most probable APIs for use in a new mashup. The API(s) with the highest confidence scores may be presented to a user for use in creating a new mashup, or utilized in the creation of the new mashup. The API(s) with the highest confidence scores may be presented to a user on a display or printed out. In various embodiments, a plurality of confidence rule may be evaluated to determine the maximum confidence. The speed and accuracy of evaluating a large set of APIs may be improved by utilizing a plurality of association rules.

In various embodiments, accuracy of Mashup recommendations may be increased by incorporating the subcomponent structures of API groups formed based on the API tags into the association rules. Unlike other association rule extraction methods, all of the possible association rules may be traversed without narrowing a search range using threshold values.

In various embodiments, speed and/or efficiency may be increased by using association rules whose right side is a set of only one element (e.g., characteristic), which may prevent a computational explosion, where calculation may be $2^{(number\ of\ tags\ of\ API)}$, where a large portion of APIs may have 16 or less tags.

FIG. 4 is a block/flow diagram illustrating a determination process of an Association Rule according to an exemplary embodiment.

In block 410, the characteristics, $I_m$, associated with the API(s), $A(m_1)$, are identified, which may be used to form set $S_m$. In various embodiments, characteristics, $I_m$, may be extracted from the Tags, $T_k$, attached to each of the API(s), $a_i$, implemented in the Mashup, $m_j$, to form a set, $S_m$.

In block 420, the characteristics, $I_x$, associated with the API(s) not included in A(m) are identified, which may be used to form set $S_x$. In various embodiments, characteristics, $I_x$, from the Tags attached to each of the API(s), $a_x$, not implemented in the Mashup may be extracted to form a set, $S_x$.

In block 430, $S_m$ may be compared to $S_x$ to identify characteristics, $I_q$, associated with the API(s), $A(m_1)$, but not in $S_x$, which may be used to form set $S_q$.

In block 440, a probability is calculated for utilizing an API not previously used for a Mashup, $m_j$, in a new Mashup. The probability for each API in relation to each Mashup may be calculated by initially setting a score for $m_i$ to zero, (mi.score=0.). Identifying an API, $a_x$, for analysis, and identify all subsets, $I_x$, for $T(a_x)$. Let P, the set of mashup-tag pairs $\{<m_j,\ t_k>\},=\emptyset$. $P=P\cup\{<m_j,\ t_k>\}$ if $S_m\subseteq TS(m_j)$ And $\exists a_i\in A(m_j)$ such that $T_1\cap T(a)=\emptyset \wedge t_k\in T(a)$. The probability of one or more API(s), $a_x$, not implemented in a Mashup, $m_j$, being used for a new Mashup may be calculated.

A confidence$(S_m\Rightarrow S_q)=|\{\forall m_j\in M|\forall<m_j,\ t_k>\ \in P\}|/|\{\forall m_j\in M|t_k\in TS(m_3)\}|$, where P is a pair set $\{<m_j,\ t_k>\}$, where $m_j\in M$, and $t_k\in T$ for all $t_k$.

Score$(S_m)$=max($\{$confidence$(S_m\Rightarrow S_q)|\forall t_k\in TS(m_j)$. $<m_j,\ t_k>\in P\}$). mj.score=max(mj.score, score$(S_m)$), for all $m_j\in M$. In various embodiments, Score$(S_m)$ and mj.score may be calculated for all $m_j\in M$.

Figure 5:
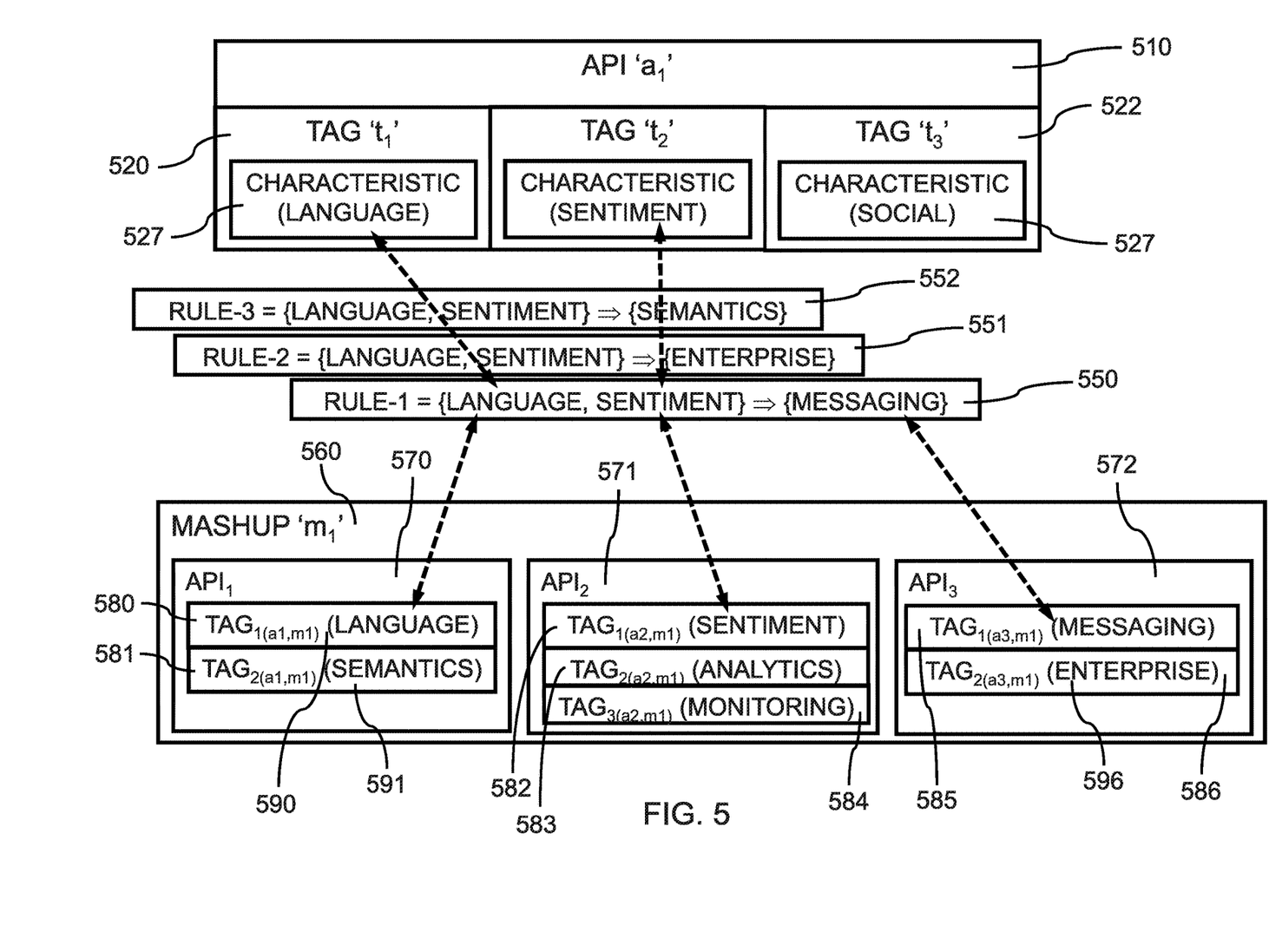
FIG. 5 is a block diagram illustrating application of association rules between a Mashup and API Tags according to an exemplary embodiment.

FIG. 5 is a block diagram illustrating application of association rules between a Mashup and API Tags according to an exemplary embodiment.

In one or more embodiments, a Tag, $t_1$, 520 attached to an API, $a_1$, 510 may include a characteristic 527, for example language, sentiment, social, associated with API, $a_1$, 510, similary for Tag $t_2$, and Tag, $t_3$, 522. The characteristics associated with $API_1$, 570, $API_2$, 571, $API_3$, 572, may be used to establish one or more association rules 550, 551, 552 by identifying a set of characteristics 590, 591, 596 for the APIs used to create Mashup, $m_1$, 560. The subset of APIs, $a_x$, forming Mashup, $m_1$, may be described by $A(m_1)$, where $A(m_1)=\{a_x|$ for every $a_x$ associated with $m_1 \wedge a_x\in A$, $m_1\in M\}$, $A(m_1)\subseteq A$. In the embodiment illustrated in FIG. 5, for example, $A(m_1)=\{API_1, API_2, API_3\}$.

In various embodiments, Tags, $t_k$, 580, 581, 582, 583, 584, 585, 586 may be attached to the APIs forming Mashup, $m_1$, 560. The Tags attached to APIs, $a_x$, may be described by $TS(a_i,m_j)$, where $TS(a_i,m_1)=\{t_k|$ for every $t_k$ associated with API, $a_i \wedge a_i\in A$, $m_1\in M\}$, $A(m_1)\subseteq A$. In the embodiment illustrated in FIG. 5, for example, $TS(a_x,m_1)=\{TAG_{1(a1,m1)}, TAG_{2(a1,m1)}, TAG_{1(a2,m1)}, TAG_{2(a2,m1)}, TAG_{3(a2,m1)}, TAG_{1(a3,m1)}, TAG_{2(a3,m1)}\}$. In various embodiments, the Tags, $t_k$, attached to $API_1$, $API_2$, $API_3$ are not the same as Tags, $t_1$, $t_2$, $t_3$. $\{TAG_{1(a1,m1)}, TAG_{2(a1,m1)}, TAG_{1(a2,m1)}, TAG_{2(a2,m1)}, TAG_{3(a2,m1)}, TAG_{1(a3,m1)}, TAG_{2(a3,m1)}\}\neq\{t_1, t_2, t_3.\}$.

Figure 6:
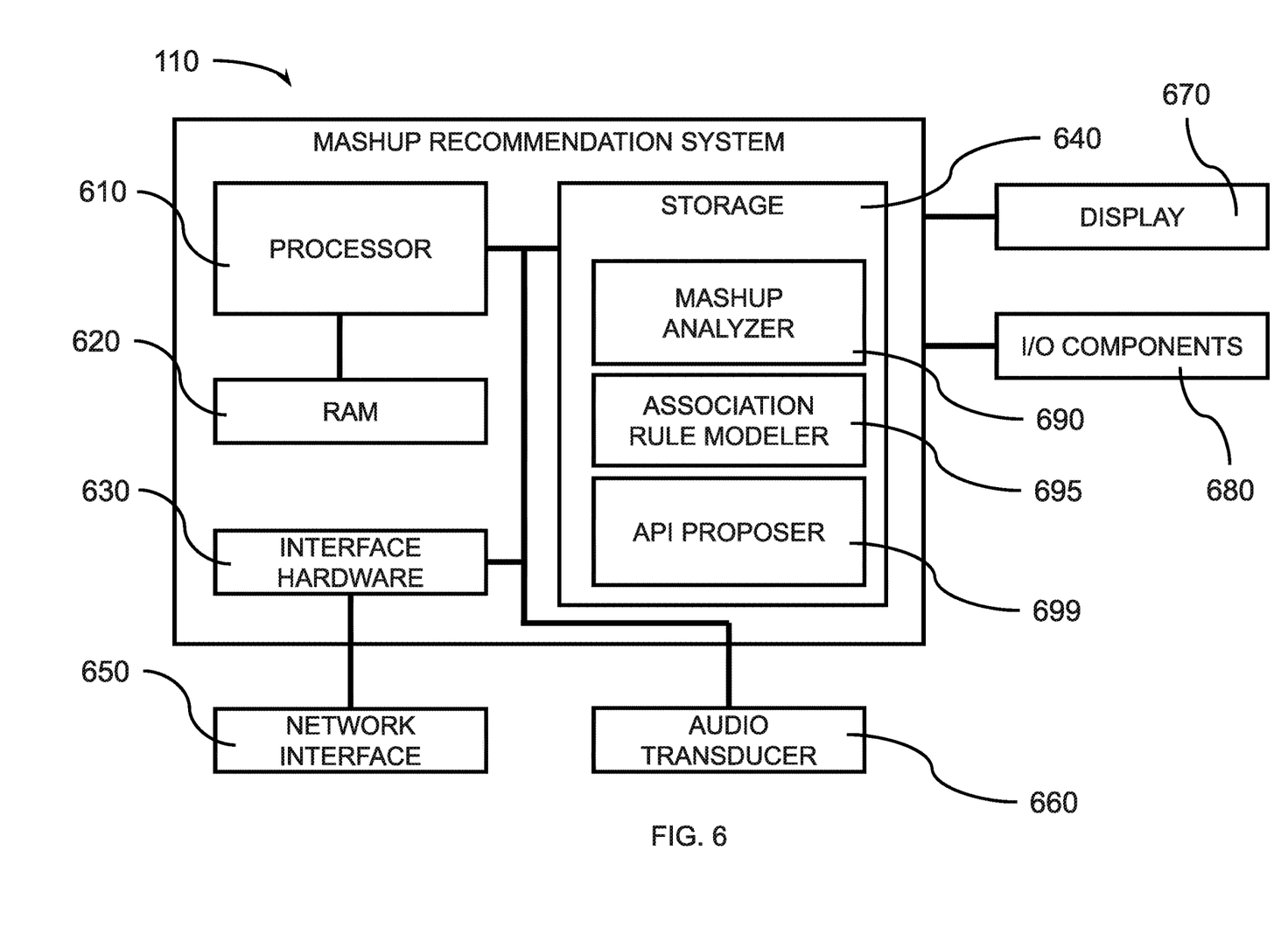
FIG. 6 is a block diagram of a mashup recommendation system according to an exemplary embodiment.

FIG. 6 is a block diagram of a mashup recommendation system according to an exemplary embodiment.

In one or more embodiments, a mashup recommendation system 110 may include a processor 610, random access memory 620, and storage memory 640, where storage memory 640 may be non-volatile memory for storing at least program code and data. A mashup analyzer 690, an association rule modeler 695, and/or an API proposer 699 may be stored in storage memory 640, which may be non-transitory. The processor 610 may be configured to locate and analyze existing Mashups from remote computer systems to identify the APIs used to form the Mashup implementing the mashup analyzer 690. The mashup recommendation system 110 may also include one or more hardware interfaces 630 for coupling to, for example, a network interface 650, which may include hardware and protocols for communicating with a network 120 and remote computer system(s) 125, 130. The mashup recommendation system 110 may also be coupled to one or more display devices 670 (e.g., monitor), one or more input-output devices 680 (e.g., keyboard, mouse, etc.), and/or audio transducer 660 (e.g., speaker) for interacting with a user. Results from the API proposer 699 may be presented to a user on display devices 670 or peripheral I/O equipment 680 (e.g., printer).

Figure 7:
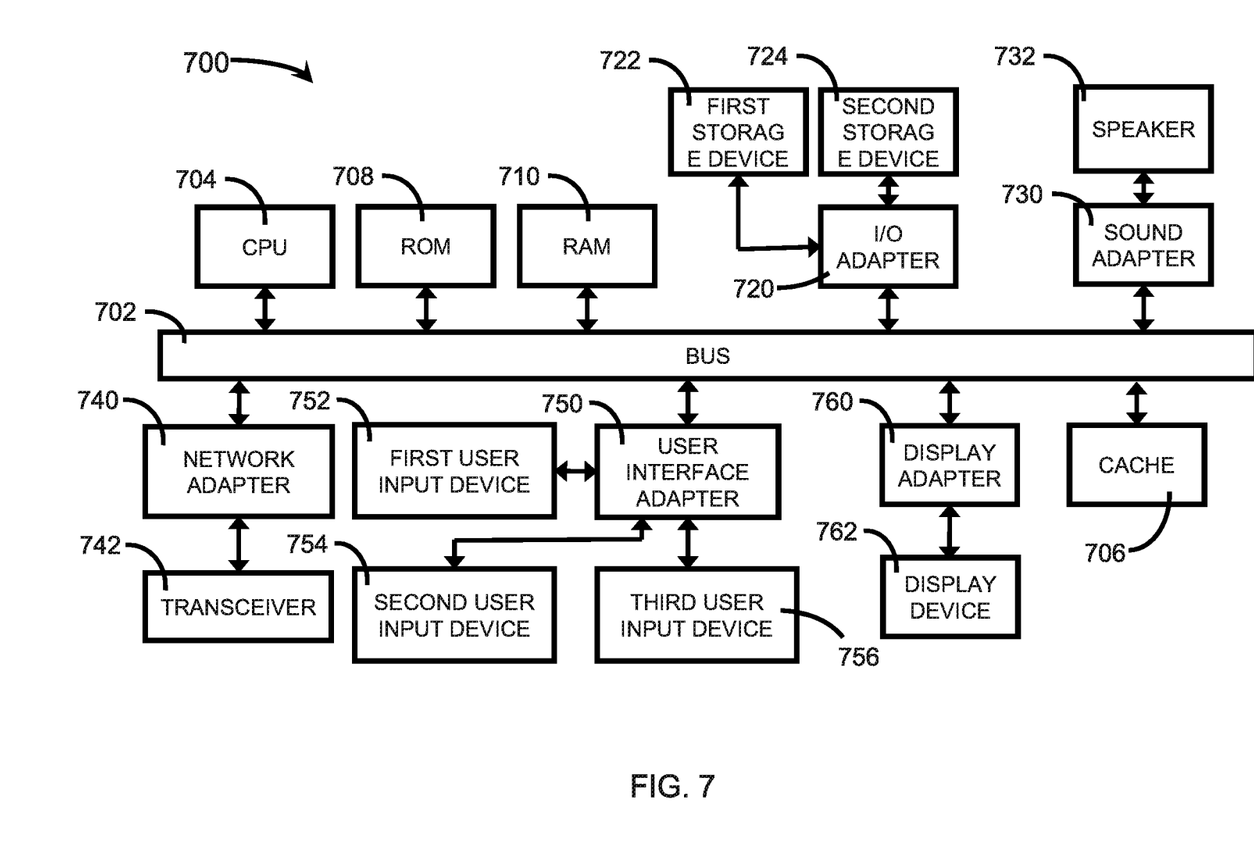
FIG. 7 is an exemplary processing system to which the present principles may be applied in accordance with an embodiment of the present disclosure.

FIG. 7 is an exemplary processing system 700 to which the present principles may be applied in accordance with an embodiment of the present disclosure. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 230. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Moreover, it is to be appreciated that system 700 is a system for implementing respective embodiments of the present principles. Part or all of processing system 700 may be implemented in one or more of the elements of FIG. 1 and/or FIG. 6.

Further, it is to be appreciated that processing system 700 may perform at least part of the method described herein including, for example, at least part of method 300 of FIG. 3, and/or at least part of method 400 of FIG. 4. Processing system 700 may also be configured to implement the mashup analyzer 690, association rule modeler 695, and/or API proposer 699 to perform any or all of the functions described herein for the analysis, modeling, and recommendation, as depicted in FIG. 5.

Having described preferred embodiments of an approach to recommending Mashups (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method of recommending Mashups, comprising:
   identifying, using a processor, one or more pre-existing Mashups that each implement one or more application program interfaces (APIs), where each implemented API provides access to an associated application program, and has one or more attached Tag(s), and each of the Tag(s) includes one or more API characteristics;
   extracting each of the one or more API characteristics from the Tags attached to each of the implemented API(s) to form a first set of all the extracted implemented API characteristics;
   identifying one or more API(s) not implemented in the identified existing Mashups; extracting each of the characteristics from the Tags attached to each of the unimplemented API(s) to form a second set of all the extracted unimplemented characteristics; identifying one or more implemented API characteristics that is an element of the first set but not an element of the second set;
   forming a third set including the one or more API characteristics that is an element of the first set but not an element of the second set;
   modeling, using the processor, a relationship between the unimplemented API(s) having unimplemented characteristics and implemented API(s) having implemented characteristics using the first set and the second set to correlate the unimplemented characteristics with the applicability of the implemented API(s) based on the implemented characteristics, which includes determining an association rule from the first set and the second set that connect unimplemented API(s) with pre-existing Mashups;
   calculating the probability of one or more unimplemented API(s) being used for a new Mashup;
   selecting the one or more unimplemented API(s) to be presented to a user based on a maximum value of confidence;
   creating a new Mashup from the one or more unimplemented API(s) by preparing computer code, using the processor, that integrates functions and formats of the one or more unimplemented API(s), wherein the functions and formats of each of the APIs determine the interaction with the associated application program; and
   presenting the one or more unimplemented API(s) to a user for use in the new Mashup.

2. The method of claim 1, which further comprises communicating via the processor, with one or more remote computer systems over a network to identify the one or more pre-existing Mashups and obtaining the implemented characteristics stored as the one or more Tag(s) attached to each implemented API.

3. The method of claim 2, wherein the one or more remote computer systems is a server and the one or more pre-existing Mashups are stored in the one or more servers.

4. The method of claim 1, wherein determining the association rule further comprises forming a Mashup-Tag pair to calculate the maximum value of the confidence for a specific pair of one of the pre-existing Mashups and the unimplemented API.

5. The method of claim 1, wherein determining the association rule does not require a lower limit of confidence value.

6. A mashup recommendation system, comprising:
   a processor and memory;
   a mashup analyzer that identifies, using the processor, one or more pre-existing Mashups that each implement one or more application program interfaces (APIs) where each implemented API provides access to an associated application program, and has one or more attached Tag(s) and each of the Tag(s) includes one or more API characteristics, and extract each of the one or more API characteristics from the Tags attached to each of the implemented API(s) to form a first set of all the extracted implemented API characteristics;
   identifying one or more API(s) not implemented in the identified existing Mashups;
   extracting each of the characteristics from the Tags attached to each of the unimplemented API(s) to form a second set of all the extracted unimplemented characteristics;
   identifying one or more implemented API characteristics that is an element of the first set but not an element of second set;
   forming a third set including the one or more API characteristics that is an element of the first set but not an element of the second set;
   an association rule modeler that models, using the processor, a relationship between the unimplemented API(s) having unimplemented characteristics and implemented API(s) having implemented characteristics using the first set and the second set to correlate the unimplemented characteristics with the applicability of the implemented API(s) based on the implemented characteristics which includes determining an association rule from the first set and the second set that connect unimplemented API(s) with pre-existing Mashups; and an API proposer that calculates the probability of one or more unimplemented API(s) being used for a new Mashup, select the one or more unimplemented API(s) to be presented to a user based on a maximum value of confidence, and create a new Mashup from the one or more unimplemented API(s) by preparing computer code, using the processor, that integrates functions and formats of the one or more unimplemented API(s), wherein the functions and formats of each of the APIs determine the interaction with the associated application program; and presenting the one or more unimplemented API(s) to a user for use in the new Mashup.

7. The system of claim 6, which further comprises a network interface that communicates via the processor, with one or more remote computer systems over a network to identify the one or more pre-existing Mashups and obtaining the implemented characteristics stored as the one or more Tag(s) attached to each implemented API.

8. The system of claim 7, wherein the one or more remote computer systems is a server and the one or more pre-existing Mashups are stored in the one or more servers.

9. The system of claim 6, wherein determining the association rule further comprises forming a Mashup-Tag pair to calculate the maximum value of the confidence for a specific pair of one of the pre-existing Mashup(s) and the unimplemented API.

10. The system of claim 6, wherein determining the association rule does not require requires a lower limit of confidence value.

11. A non-transitory computer readable storage medium comprising a computer readable program for a method of recommending Mashups, wherein the computer readable program when executed on a computer causes the computer to perform the steps of:

identifying, using a processor, one or more pre-existing Mashups that each implement one or more application program interfaces (APIs), where each implemented API provides access to an associated application program, and has one or more attached Tag(s), and each of the Tag(s) includes one or more API characteristics;

extracting each of the one or more API characteristics from the Tags attached to each of the implemented API(s) to form a first set of all the extracted implemented API characteristics;

identifying one or more API(s) not implemented in the identified existing Mashups; extracting each of the characteristics from the Tags attached to each of the unimplemented API(s) to form a second set of all the extracted unimplemented characteristics;

identifying one or more implemented API characteristics that is an element of the first set but not an element of the second set;

forming a third set including the one or more API characteristics that is an element of the first set but not an element of the second set;

modeling, using the processor, a relationship between the unimplemented API(s) having unimplemented characteristics and implemented API(s) having implemented characteristics using the first set and the second set to correlate the unimplemented characteristics with the applicability of the implemented API(s) based on the implemented characteristics, which includes determining an association rule from the first set and the second set that connect unimplemented API(s) with pre-existing Mashups;

calculating the probability of one or more unimplemented API(s) being used for a new Mashup;

selecting the one or more unimplemented API(s) to be presented to a user based on a maximum value of confidence;

creating a new Mashup from the one or more unimplemented API(s) by preparing computer code, using the processor, that integrates functions and formats of the one or more unimplemented API(s), wherein the functions and formats of each of the APIs determine the interaction with the associated application program; and presenting the one or more unimplemented API(s) to a user for use in the new Mashup.

12. The non-transitory computer readable storage medium of claim 11, wherein the steps further comprise communicating via the processor, with one or more remote computer systems over a network to identify the one or more pre-existing Mashups and obtaining the characteristics stored as the one or more Tag(s) attached to each implemented API.

\* \* \* \* \*